(12) United States Patent
Bitan et al.

(10) Patent No.: US 8,677,121 B2
(45) Date of Patent: Mar. 18, 2014

(54) MONITORING ENCRYPTED SESSION PROPERTIES

(75) Inventors: Hen Bitan, Kedime (IL); Albert Kashchenvsky, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 13/563,175

(22) Filed: Jul. 31, 2012

(65) Prior Publication Data

US 2014/0040615 A1     Feb. 6, 2014

(51) Int. Cl.
*H04L 29/06*     (2006.01)

(52) U.S. Cl.
USPC .......................................... 713/164; 380/277

(58) Field of Classification Search
USPC .......... 713/164, 165, 166, 167, 168; 726/4, 5, 726/6, 7, 8, 9, 10, 18, 19, 20; 380/277
See application file for complete search history.

(56) References Cited

U.S. PATENT DOCUMENTS

| | | |
|---|---|---|
| 7,581,099 B2 | 8/2009 | Ong |
| 2006/0059546 A1 | 3/2006 | Nester et al. |
| 2008/0109870 A1 | 5/2008 | Sherlock et al. |
| 2008/0298588 A1 | 12/2008 | Shakkarwar |
| 2009/0089625 A1 | 4/2009 | Kannappan et al. |
| 2010/0043065 A1* | 2/2010 | Bray et al. ................. 726/8 |
| 2011/0314275 A1* | 12/2011 | Gopshtein et al. ........... 713/165 |
| 2012/0151211 A1* | 6/2012 | Kreiner et al. ............... 713/168 |

OTHER PUBLICATIONS

"Evidian Enterprise SSO," < http://www.evidian.com/iam/enterprise-sso/ > 1 page.

* cited by examiner

*Primary Examiner* — Eleni Shiferaw
*Assistant Examiner* — Abu Sholeman

(57) ABSTRACT

Methods and systems for monitoring encrypted session properties include receiving a number of encrypted session properties at a real user monitor (RUM) on a real user monitoring (RUM) system, decrypting the number of encrypted session properties using an identity and access management (IAM) agent on the RUM system, and sending the number of decrypted session properties from a RUM mirror application to the RUM.

13 Claims, 3 Drawing Sheets

MONITORING ENCRYPTED SESSION PROPERTIES

BACKGROUND

Monitors can detect and monitor traffic on a computing network. The monitors can monitor traffic on a computing network to determine properties associated with the traffic. The traffic can include encrypted data and the monitor can decrypt the encrypted data to obtain properties associated with the portion of the traffic that includes encrypted data.

DETAILED DESCRIPTION

Figure 1:
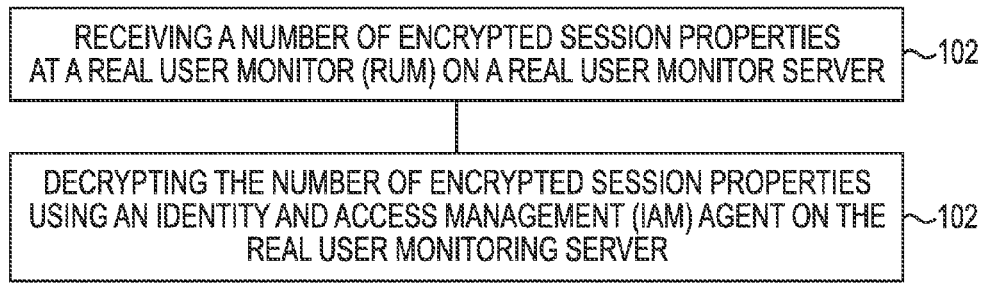
FIG. 1 is a flow chart illustrating an example of a method for monitoring encrypted session properties according to the present disclosure.

Applications can be utilized throughout various locations around the world by users on various networks (e.g., wide area network (WAN), local area network (LAN), etc.). A user's computing device can utilize the various networks to perform various functions of applications (e.g., communication with a server, downloads, updates, etc.). While utilizing the various networks to perform various functions of the applications, the data transferred between a user and an application on the various networks can include various session properties. A portion of the various session properties can be protected by encryption. For example, the various session properties can be transferred in a secure sign-on (SSO) token that includes an encrypted user name. An identity and access management (IAM) system can be used to protect the encrypted session properties of the data transferred between a user and an application on the various networks.

The session properties of the data transferred between a user and an application can be monitored. A monitor can use the session properties of the data transferred between the user and the application to determine metrics associated with the application's use. These metrics can be used to analyze and improve an application's functions.

Previous approaches of monitoring encrypted session properties included developing an application to decrypt the session properties using a software development kit (SDK) and/or an application programming interface (API) of the IAM system that is protecting the encrypted session properties. Therefore, the previous approaches of monitoring encrypted session properties included developing an application to decrypt session properties for each of the different IAM systems protecting encrypted session properties.

The present disclosure includes methods and systems for monitoring encrypted session properties. A number of embodiments include receiving a number of encrypted session properties at a real user monitor (RUM) on a real user monitoring (RUM) system and decrypting the number of encrypted session properties using an identity and access management (IAM) agent on the RUM system.

In a number of embodiments of the present disclosure, an IAM agent of the IAM system protecting the encrypted session properties and a mirror application can be used to decrypt encrypted session properties and to provide decrypted session properties to the monitor that is monitoring the session properties transferred between a user and an application.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method for monitoring encrypted session properties according to the present disclosure. At 102, a number of encrypted session properties can be received at a real user monitor (RUM) on a real user monitoring RUM system. The RUM can monitor session properties associated with the data that is transferred between a user and an application. The RUM can be placed on a network between a user and an application to monitor the session properties of the data transferred between the user and the application. A portion of the session properties can be encrypted. An identity and access management (IAM) system can be placed on the network between the user and the application to protect the session properties associated with the data transferred between the user and the application. The IAM system can include IAM agents and IAM servers to provide decrypted, e.g., unprotected, session properties to only the application and/or the user.

At 104, the number of encrypted session properties can be decrypted using an IAM agent on the RUM system. When the RUM receives encrypted session properties, the RUM can call a RUM mirror application on the RUM system. The call can include a request that arrives at an IAM agent on RUM system. The request can include the desired encrypted session property in the header of the request. The IAM agent can decrypt the encrypted session property and send the decrypted session property in the header of the request to the RUM mirror application. The RUM mirror application can return the decrypted session properties to the RUM in the response to the call from the RUM.

Figure 2:
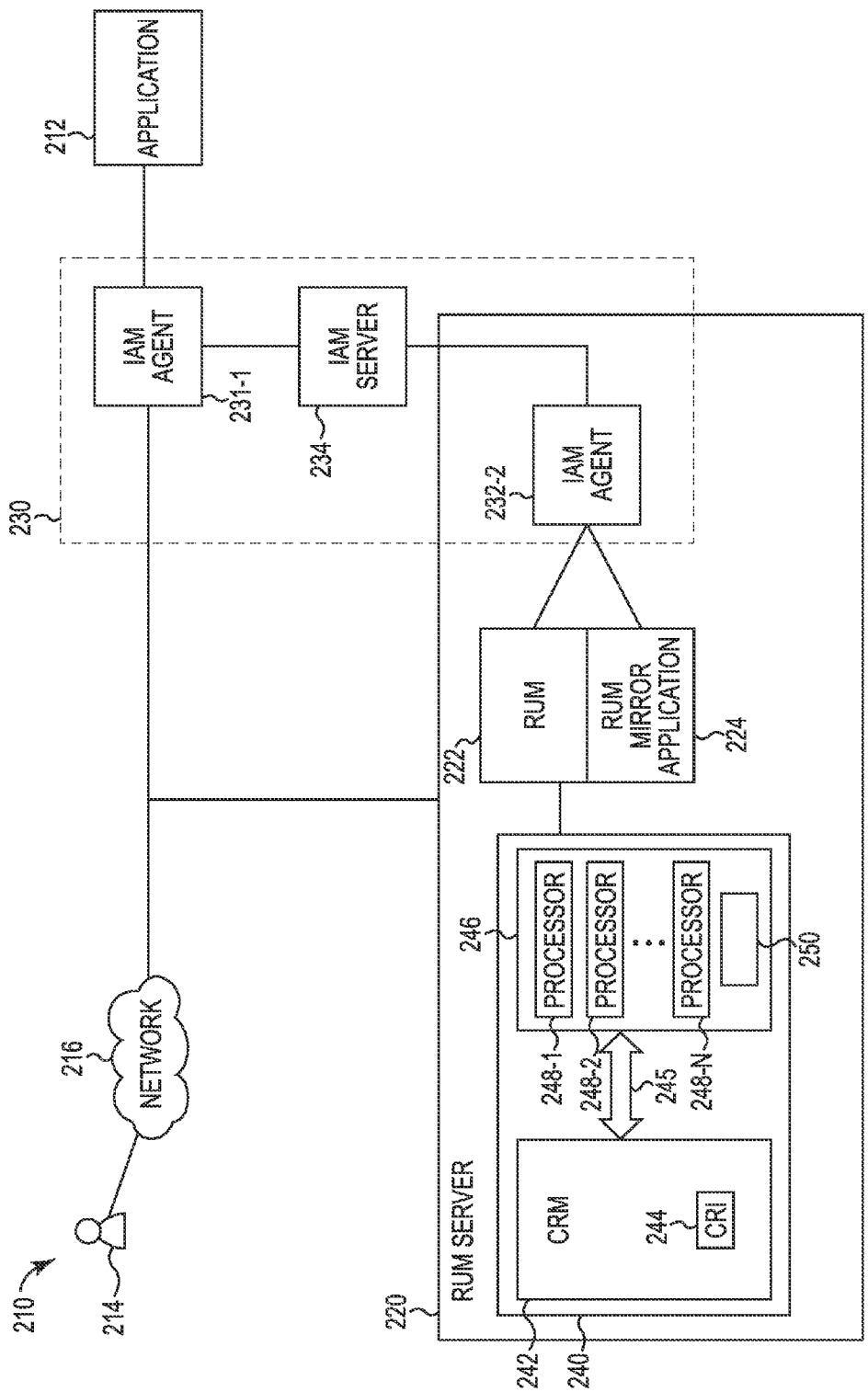
FIG. 2 illustrates a diagram of an example of system for providing a simulated network according to the present disclosure.

FIG. 2 illustrates a diagram of an example of system 210 for monitoring encrypted session properties according to the present disclosure. The system 210 can include an application 212 and a user 214 coupled to a network 216. In a number of embodiments, the system 210 can include a number of applications and a number of users coupled to a number of networks. Network 216 can be a wide area network (WAN), a local area network (LAN), or the internet, for example, among other network types. The number of applications can be located in a number of different locations and be utilizing a number of different networks.

The system 210 can include an identity and access management (IAM) system 230. The IAM system 230 can protect the data transferred between the user 214 and the application 212 on network 216 by allowing encrypted data to be transferred on network 216 and providing decrypted data only to application 212 and/or user 214. The IAM system 230 can include IAM agents 232-1 and 232-2 and IAM server 234. IAM agent 232-1 can protect application 212 by receiving encrypted data, decrypting the encrypted data using IAM server 234, and providing the decrypted data only to application 212. IAM agent 232-2 can protect RUM mirror application 224 by receiving encrypted data, decrypting the encrypted data using IAM server 234, and providing the decrypted data only to RUM mirror application 224.

System 210 can include a monitor, such as real user monitor (RUM) 222, for example. RUM 222 can be placed between user 214 and application 212 on network 216 and can be coupled to network 216 via a network port and/or tap. The RUM 222 can record some or all of interactions between user 214 and application 212. For example, the RUM 222 can record session properties of the data that is transferred between user 214 and application 212. In some examples, the RUM 222 can receive encrypted session properties that need to be decrypted in order for the RUM 222 to record and use the session properties.

The RUM system 220 can include RUM 222, RUM mirror application 224, IAM agent 232-2, and computing device 240. In some examples, RUM system 220 can be a server that includes a RUM, a RUM mirror application, and IAM agent, and/or a computing device. RUM 222 can receive session properties from data that is transferred between user 214 and application 212. In some examples, a portion of the session properties can be encrypted. RUM 222 can extract the encrypted session properties and call RUM mirror application 224 for the decrypted session properties. The call can include a request that arrives at IAM agent 232-2 on RUM server 220. The IAM agent 232-2 can be part of the IAM system 230 and the IAM system 230 can be configured to include IAM agent 232-2 on RUM server 220. IAM agent 232-2 can be used to protect RUM mirror application 224 by providing decrypted session properties to RUM mirror application 224. The request can include an encrypted session property, such as a user name, desired by RUM 222 in the header of the request. The IAM agent 232-2 can decrypt the encrypted session property and send the decrypted session property in the header of the request to RUM mirror application 224. RUM mirror application 224 can return the decrypted session properties to RUM 222 in the response to the call from RUM 222.

Figure 3:
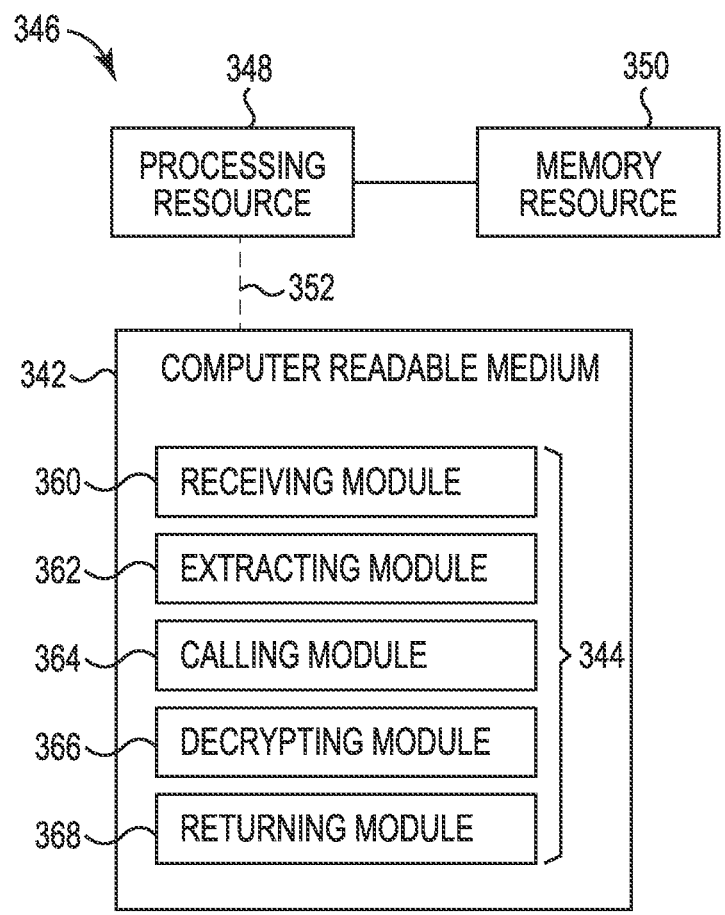
FIG. 3 illustrates a diagram of an example of a computing device according to the present disclosure.

The computing system 240 on RUM server 220 can include computer-readable medium (CRM) 242 in communication with the processing resources 248-1, 248-2 . . . 248-N. CRM 242 can be in communication with a computing device 246 (e.g., a Java® application server, among others) having processing resources of more or fewer than processing resources 248-1, 248-2 . . . 248-N. The computing device 246 can be in communication with a tangible non-transitory CRM 242 storing a set of computer-readable instructions (CRI 244) executable by one or more of the processing resources 248-1, 248-2 . . . 248-N, as described herein. The CRI 244 can also be stored in remote memory managed by a server and/or represent an installation package that can be downloaded, installed, and executed. The CRI 244, for example, can include a number of modules as shown in FIG. 3. The computing device 246 can include memory resources 250, and the processing resources 248-1, 248-2 . . . 248-N can be coupled to the memory resources 250.

Processing resources 248-1, 248-2 . . . 248-N can execute CRI 244 that can be stored on an internal or external non-transitory CRM 242. The processing resources 248-1, 248-2 . . . 248-N can execute CRI 244 to perform various functions, including the functions described herein. For example, the processing resources 248-1, 248-2 . . . 248-N can execute CRI 244 to monitor encrypted session properties. A non-transitory CRM (e.g., CRM 242), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 242 can be integral, or communicatively coupled, to the computing device 246, in a wired and/or a wireless manner. For example, the non-transitory CRM 242 can be an internal memory, a portable memory, a portable disk, or a memory associated with another computing resource.

The CRM 242 can be in communication with the processing resources 248-1, 248-2 . . . 248-N via the communication path 245. The communication path 245 can be local or remote to a machine (e.g., a computing device 246) associated with the processing resources 248-1, 248-2 . . . 248-N. Examples of a local communication path 245 can include an electronic bus internal to a machine (e.g., a computer) where the CRM 242 is one of volatile, non-volatile, fixed, and/or removable storage medium in communication with the processing resources 248-1, 248-2 . . . 248-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 245 can be such that the CRM 242 can be remote from the processing resources e.g., 248-1, 248-2 . . . 248-N, such as in a network connection between the CRM 242 and the processing resources (e.g., 248-1, 248-2 . . . 248-N). That is, the communication path 245 can be a network connection. Examples of such a network connection can include a local area network (LAN), wide area network (WAN), personal area network (PAN), and the Internet, among others. In such examples, the CRM 242 can be associated with a first computing device and the processing resources 248-1, 248-2 . . . 248-N can be associated with a second computing device (e.g., computing device 246). For example, processing resources 248-1, 248-2 . . . 248-N can be in communication with a CRM 242. For instance, the CRM 242 can include a set of instructions and the processing resources 248-1, 248-2 . . . 248-N can be designed to carry out the set of instructions to monitor encrypted session properties, as described herein.

In various examples, the processing resources 248-1, 248-2 . . . 248-N coupled to the memory resources 250 can execute program instructions to enable the RUM 222 to receive session properties from data that is transferred between user 214 and application 212. The session properties can included encrypted session properties, such as a user name, for example, that are part of an SSO token.

Additionally, in various examples, the processing resources 248-1, 248-2 . . . 248-N coupled to the memory resources 250 can execute program instructions to enable the RUM 222 to extract the encrypted session properties session properties from the session properties received by the RUM 222. The RUM 222 can obtain and record the session properties received that are not encrypted.

In some examples, the processing resources 248-1, 248-2 . . . 248-N coupled to the memory resources 250 can execute program instructions to enable the RUM 222 to call RUM mirror application 224 for decrypted session properties from the encrypted session properties that were extracted by the RUM 222.

In some examples, the processing resources 248-1, 248-2 . . . 248-N coupled to the memory resources 250 can execute program instructions to enable the RUM 222 to send the encrypted session properties to the IAM agent 232-2 and the IAM agent 232-2 can decrypt the encrypted session properties.

In some examples, the processing resources 248-1, 248-2 . . . 248-N coupled to the memory resources 250 can execute program instructions to enable the IAM agent 232-2 to send the decrypted session properties to the RUM mirror application 224. The decrypted session properties can be sent to the RUM mirror application in the header of request for decrypted session properties from RUM 222.

In some examples, the processing resources 248-1, 248-2 . . . 248-N coupled to the memory resources 250 can execute program instructions to enable the RUM mirror application 224 to return the decrypted session properties to the RUM 222 in response to the call from RUM 222. The RUM 222 can obtain and record the decrypted session properties received from the RUM mirror application 224. The decrypted session properties can be returned to the RUM 222 by the RUM mirror application 224 through the IAM agent 232-2.

FIG. 3 illustrates an example of a computing device 346 according to the present disclosure. The computing device 346 can utilize software, hardware, firmware, and/or logic to perform a number of functions.

The computing device 346 can be a combination of hardware and program instructions configured to perform a number of functions. The hardware, for example, can include one or more processing resources 348, computer readable medium (CRM) 342, memory resource 350, etc. The program instructions, e.g., computer-readable instructions (CRI) 344, can include instructions stored on the CRM 342 to implement a desired function, e.g., define relationships.

The processing resources 348 can be in communication with the tangible non-transitory CRM 342 storing the set of CRI 344 executable by one or more of the processing resources 348, as described herein. The CRI 344 can also be stored in remote memory managed by a server and represent an installation package that can be downloaded, installed and executed. The computing device 346 can include memory resources 350, and the processing resource 348 can be coupled to the memory resource 350.

Processing resource 348 can execute CRI 344 that can be stored on internal or external non-transitory CRM 342. The processing resource 348 can execute CRI 344 to perform various functions, including the functions described herein, among others.

The number of modules 360, 362, 364, 366, and 368 can include CRI 344 that when executed by the processing resource 348 can perform a number of functions. The number of modules 360, 362, 364, 366, and 368 can be sub-modules of other modules. For example, a receiving module 360 and a extracting module 362 can be sub-modules and/or contained within a single module. Furthermore, the number of modules 360, 362, 364, 366, and 368 can comprise individual modules separate and distinct from one another.

A receiving module 360 can comprise CRI 344 and can be executed by the processing resource 348 to receive session properties from data that is transferred between a user and an application. The session properties can included encrypted session properties, such as a user name, for example, that are part of an SSO token.

An extracting module 362 can comprise CRI 344 and can be executed by the processing resource 348 to extract the encrypted session properties session properties from the session properties received by the RUM. The RUM can identify which of the received session properties are encrypted and extract the encrypted session properties from the received session properties.

A calling module 364 can comprise CRI 344 and can be executed by the processing resource 348 to call RUM mirror application for decrypted session properties from the encrypted session properties that were extracted by the RUM. The call can include a request that arrives at an IAM agent on a RUM server. The request can include encrypted session properties, such as a user name, desired by the RUM in the header of the request.

A decrypting module 366 can comprise CRI 344 and can be executed by the processing resource 348 to decrypt the encrypted session properties received from the RUM. The IAM agent 232-2 can send the decrypted session properties to the RUM mirror application. The decrypted session properties can be sent to the RUM mirror application in the header of request for decrypted session properties sent by the RUM.

A returning module 368 can comprise CRI 344 and can be executed by the processing resource 348 to return the decrypted session properties to the RUM in response to the call from the RUM. The RUM can obtain and record the decrypted session properties received from the RUM mirror application. The decrypted session properties can be returned to the RUM by the RUM mirror application through the IAM agent.

A non-transitory CRM 342 can be analogous to CRM 242 illustrated and described with respect to FIG. 2.

The non-transitory CRM 342 can be integral or communicatively coupled to a computing device in a wired and/or wireless manner. For example, the non-transitory CRM 342 can be an internal memory, a portable memory, and a portable disk, or a memory associated with another computing resource, e.g., enabling CRIs 344 to be transferred and/or executed across a network such as the Internet.

The CRM 342 can be in communication with the processing resource 348 via a communication path 345. The communication path 345 can be analogous to communication path 245 illustrated and described with respect to FIG. 2.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for monitoring encrypted session properties comprising:
   receiving a number of session properties at a real user monitor (RUM);
   extracting a number of encrypted session properties from the number of session properties at the RUM on a real user monitoring (RUM) system;
   calling a RUM mirror application for decrypted session properties with a request from the RUM;
   decrypting the number of encrypted session properties using an identity and access management (IAM) agent on the RUM system; and
   sending the number of decrypted session properties from the RUM mirror application to the RUM.

2. The method of claim 1, wherein decrypting the number of encrypted session properties using the IAM agent includes the IAM agent contacting an IAM server to decrypt the number of encrypted session properties.

3. The method of claim 2, wherein the IAM agent on the RUM system and the IAM server are part of an IAM system.

4. The method of claim 3, wherein the IAM system protects data transferred between a user and an application using a number of IAM agents and the IAM server.

5. The method of claim 1, comprising configuring the IAM system to include the IAM agent on the RUM system.

6. A non-transitory computer-readable medium storing instructions for defining relationships executable by a computer to cause the computer to:
   receive a number of session properties at a real user monitor (RUM);
   extract encrypted session properties from the number of session properties at the RUM;
   call a RUM mirror application with the encrypted session properties;
   decrypt the encrypted session properties with an identity and access management (IAM) agent that protects the RUM mirror application; and
   return decrypted session properties from the RUM mirror application to the RUM.

7. The medium of claim 6, wherein the instructions executable to extract encrypted session properties from the number of session properties include instructions executable to extract a protected user name from the encrypted session properties.

8. The medium of claim 7, wherein the instructions executable to extract encrypted session properties from the number of session properties include instructions executable to decrypt the protected user name from a secure sign on (SSO) token.

9. The medium of claim 6, wherein the instructions are executable to send decrypted session properties from the RUM mirror application to the RUM through the IAM agent.

10. The medium of claim 6, wherein the instructions executable to decrypt the encrypted session properties include instructions executable to decrypt the encrypted session properties with the IAM agent on a RUM system.

11. A system for monitoring encrypted session properties, comprising:
    a processing resource in communication with a hardware memory, wherein the hardware memory includes a set of instructions, and wherein the processing resource is designed to execute the set of instructions to:
    receive a number of session properties at a real user monitor (RUM);
    extract a number of encrypted session properties from the number of session properties at the real user monitor (RUM);
    call a RUM mirror application with the encrypted session properties and provide the number of encrypted session properties to an identity and access management (IAM) agent on a RUM system, wherein the IAM agent is protecting the RUM mirror application;
    decrypt the number of encrypted session properties using the IAM agent on the RUM system and send the number of decrypted session properties to the RUM mirror application; and
    return the number of decrypted session properties to the RUM.

12. The system of claim 11, wherein the set of instructions include instructions executable to configure the IAM agent on the RUM server to protect the RUM mirror application on the RUM system.

13. The system of claim 11, wherein the set of instructions include instructions executable to provide decrypted session properties from the IAM agent to only the RUM mirror application and the RUM.

* * * * *